United States Patent [19]

Yoshida

[11] Patent Number: 4,670,666

[45] Date of Patent: Jun. 2, 1987

[54] MOS TRANSISTOR CIRCUIT FOR SHARED PRECHARGING OF BUS LINES

[75] Inventor: Toyohiko Yoshida, Itami, Japan

[73] Assignee: Mitsubishi Denki Kabushiki Kaisha, Tokyo, Japan

[21] Appl. No.: 756,638

[22] Filed: Jul. 19, 1985

[30] Foreign Application Priority Data

Jul. 26, 1984 [JP] Japan .................. 59-158003

[51] Int. Cl.[4] .................. G11C 7/00; G11C 11/40
[52] U.S. Cl. .................. 307/246; 307/468; 307/481; 365/203; 377/57
[58] Field of Search .......... 307/246, 468, 469, 481; 377/57; 340/804, 825.15; 365/203

[56] References Cited

U.S. PATENT DOCUMENTS 3,848,236 11/1974 Troutman ............ 365/203
4,458,336 7/1984 Takemae ............ 365/203
4,495,602 1/1985 Sheppard ............ 365/203

Primary Examiner—John S. Heyman
Attorney, Agent, or Firm—Sughrue, Mion, Zinn, Macpeak and Seas

[57] ABSTRACT

An MOS transistor circuit for precharging parasitic capacitances $C_1$–$C_8$ associated with a plurality of parallel data transfer bus lines 1–8 under the control of a clock signal $\phi$. Each bus line is pulled up to an "H" state through associated MOS transistors $T_1$–$T_8$, and only selected bus lines are thereafter pulled down to the "L" state pursuant to a bit transfer operation. The circuit is also provided with a series of MOS transistors $T_{11}$–$T_{17}$ coupled across the adjacent bus lines such that the precharging of the discharged bus lines is contributed to by charging paths associated with non-discharged lines, to thereby shorten the overall precharging time and equalize the charge potentials.

8 Claims, 2 Drawing Figures

MOS TRANSISTOR CIRCUIT FOR SHARED PRECHARGING OF BUS LINES

BACKGROUND OF THE INVENTION

This invention relates to an MOS transistor circuit for precharging a plurality of bus lines over which data logic signals are transferred.

In a logical operation system provided with an ALU (arithmetic and logic unit) a plurality of parallel bus lines are utilized to transfer logic signals whose bits correspond to the number of the bus lines. In a system where 8 parallel bus lines are used to transfer 8-bit logic signals, for example, a selected number of bus lines out of the 8 are discharged after an initial precharging of all of the lines to thereby transfer the 8-bit binary signal to an ALU. The 8 parallel bus lines are then precharged again in response a clock signal, and another set of selected bus lines is discharged to transfer another 8-bit signal through them. The ALU may then add the two 8-bit signals and store the result in a register, for example.

To precharge a plurality of parallel bus lines as described above, a conventional MOS transistor circuit comprised of 8 PMOS transistors $T_1$-$T_8$ for 8 parallel bus lines 1 through 8 has been used, as shown in FIG. 1 for example. These MOS transistors have first electrodes connected to a common voltage source V, and second electrodes individually connected to the respective bus lines. Each of their gate electrodes is connected to a common clock signal line $\phi$. Each parallel bus line has a parasitic capacitance represented by capacitors $C_1$ through $C_8$ connected to the ground G.

In this conventional circuit, when the clock signal line becomes "L" or low at the precharge period, the PMOS transistors $T_1$-$T_8$ are turned on and all of the bus lines 1-8 are pulled up to the "H" or high state to charge the capacitors $C_1$-$C_8$.

The clock signal line $\phi$ then becomes "H" to turn off all of the PMOS transistors $T_1$-$T_8$ and hold the capacitors $C_1$-$C_8$ in their precharging state.

Assuming that the bus lines 3, 6 and 7 are now pulled down to "L" and the other bus lines 1, 2, 4, 5 and 8 are kept in the "H" state, an 8-bit data signal 11011001 will be transferred through the parallel bus lines to the ALU. The "L" state corresponds to a logic "0", and the "H" state corresponds to a logic "1". All of the bus lines are then precharged again through the transistors $T_1$-$T_8$ when the clock signal $\phi$ goes low, in preparation for the next transfer cycle.

Since capacitors $C_1$, $C_2$, $C_4$, $C_5$ and $C_8$ were previously charged up to the source voltage level V and were not discharged during the signal transfer, their precharging or recharging is performed in an extremely short time period. Capacitors $C_3$, $C_6$ and $C_7$ were discharged, on the other hand, and it thus takes considerably more time to precharge them back up to the source voltage V through transistors $T_3$, $T_6$ and $T_7$. Moreover, since the bus lines 3, 6 and 7 which have been pulled down to "L" and the bus lines 1, 2, 4, 5 and 8 which have not been pulled down must be equally precharged, the PMOS transistors $T_1$-$T_8$ must each have enough driving capacity to charge a bus line up to the source voltage level during the precharge period. Finally, since each of the bus lines is exclusively charged through its individual PMOS transistor, variations in the voltage level of the bus lines result when the precharge time is set too short.

SUMMARY OF THE INVENTION

In accordance with the present invention a series of additional MOS transistors are individually connected across adjacent bus lines, and their conductivity is controlled by the same common clock signal. In this manner the precharging of discharged bus lines/capacitances is contributed to by those charging paths associated with any non-discharged lines, which reduces the overall precharging time and equalizes the respective charge potentials.

DETAILED DESCRIPTION OF THE PREFERRED EMBODIMENT

Figure 2:
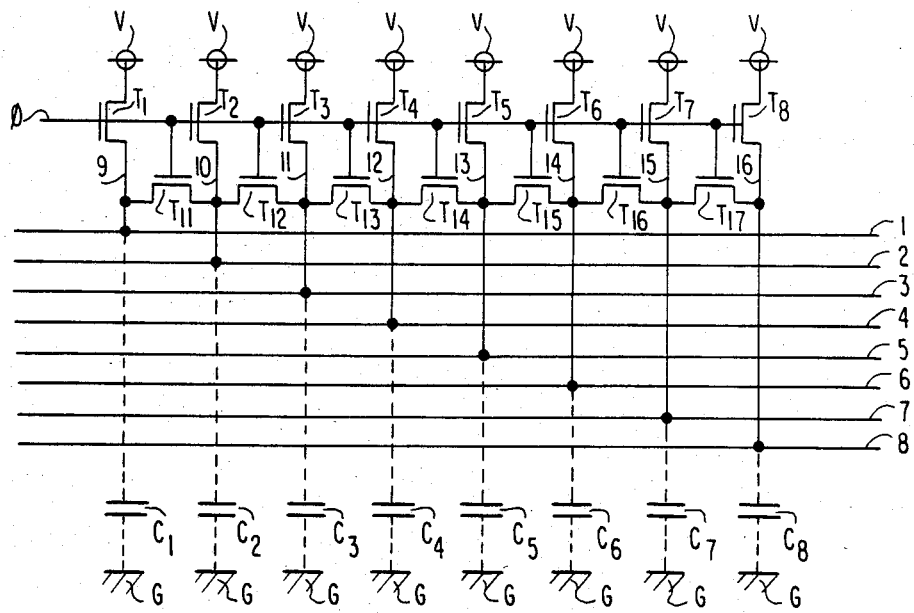
FIG. 2 shows a schematic diagram of an embodiment of an MOS transistor circuit for precharging bus lines according to the present invention.

Referring to FIG. 2, the first electrodes of first PMOS transistors $T_1$-$T_8$ are individually connected to a common voltage source V, and the second electrodes are individually connected to the respective bus lines 1-8 by lines 9-16. The gate electrodes of transistors $T_1$-$T_8$ are connected to a common clock signal line $\phi$, and each of the bus lines 1-8 has parasitic capacitance represented by grounded capacitors $C_1$-$C_8$. The MOS transistor circuit of FIG. 2 is also provided with second PMOS transistors $T_{11}$-$T_{17}$ having their first and second electrodes respectively connected across the second electrodes of transistors $T_1$-$T_8$. For example, the first and second electrodes of transistor T are connected across lines 9 and 10, and similarly those of transistor $T_{17}$ are connected across lines 15 and 16. The gate electrodes of transistors $T_{11}$-$T_{17}$ are connected to the common clock signal line $\phi$.

In the circuit thus arranged, each of the transistors $T_1$-$T_8$ is turned on when the clock signal line $\phi$ becomes "L", causing each of the bus lines 1-8 to be pulled up to "H" through the respective transistors to charge the capacitors $C_1$-$C_8$. When the clock signal line $\phi$ subsequently becomes "H", following the example used above, each of the transistors $T_1$-$T_8$ is turned off which causes the selected bus lines 3, 6 and 7 to be pulled down to "L" with the remaining bus lines 1, 2, 4, 5 and 8 staying at the "H" level, resulting in the flow of an 8-bit data signal 11011001 through the bus lines.

When the clock signal line $\phi$ subsequently becomes "L" each of the bus lines 1-8 is again precharged with all of the PMOS transistors $T_1$-$T_8$ and $T_{11}$-$T_{17}$ in their conductive state. Under these conditions, the discharged capacitors $C_3$, $C_6$ and $C_7$ will now be precharged not only through their associated transistors $T_3$, $T_6$ and $T_7$, but also through the remaining transistors in various series combinations. Capacitor $C_3$, for example, will receive converging charge contributions through transistors $T_4$ and $T_{13}$, through transistors $T_2$ and $T_{12}$ and through transistors $T_1$, $T_{11}$ and $T_{12}$.

Figure 1:
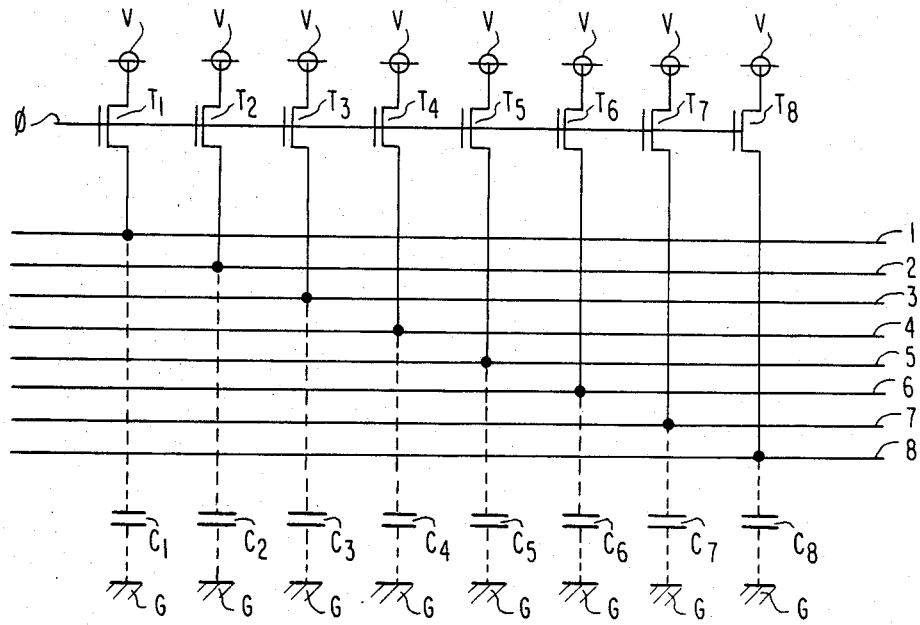
FIG. 1 shows a schematic diagram of a conventional MOS transistor circuit for precharging bus lines.

Such precharging through a plurality of line paths considerably shortens the precharging time period on average, as contrasted with the conventional arrangement of FIG. 1. The resulting precharging time savings will be generally proportional to the number of "1" bits in a given signal, with a maximum shortening being achieved with a 11101111 signal, for example.

The interconnection of lines 9-16 by the conductive transistors $T_{11}-T_{17}$ also serves to equalize the precharged voltage level of each bus line, which stabilizes the precharging operation and promotes more uniform transferred bit amplitudes. Although PMOS transistors are only provided for connecting adjacent bus lines in the embodiment shown, those bus lines separated from each other by intermediate bus lines can also be connected through additional PMOS transistors. For example, additional transistors could be provided to individually connect line 12 directly to each of lines 9-10 and 14-16, etc. The MOS transistor circuit according to the invention can also be applied to a bus system in which only one of a plurality of bus lines is pulled down to the "L" state, such as a decoder circuit in a semiconductor memory unit.

What is claimed is:

1. An MOS transistor circuit for enhancing the precharging of discharged ones of a plurality of parasitic capacitances ($C_1-C_8$) individually associated with an equal plurality of data transfer bus lines (1-8) following a data bit transfer, comprising: a common clock signal line ($\Phi$); a plurality of first MOS precharging transistors ($T_1-T_8$) corresponding to the number of bus lines, said transistors having first electrodes connected to a voltage source (V), second electrodes individually connected to said bus lines, and gate electrodes connected to said common clock signal line; and a plurality of second MOS precharging transistors ($T_{11}-T_{17}$) having first and second electrodes individually connected transversely between successive second electrodes of said first MOS transistors, and gate electrodes connected to said common clock signal line to establish lateral charge paths leading away from non-discharged capacitances and converging at discharged capacitances to attendantly shorten the average precharging time.

2. A circuit as defined in claim 1, wherein the first and second electrodes of each second MOS transistor are respectively connected to the second electrodes of two first MOS transistors connected to adjacent bus lines.

3. A circuit as defined in claim 2, wherein there are n bus lines and n−1 second MOS transistors.

4. A circuit as defined in claim 1, wherein each of the first electrodes of said first MOS transistors is connected to a common voltage source.

5. An MOS transistor circuit including a plurality of data transfer bus lines (1-8), an equal plurality of parasitic capacitances ($C_1-C_8$) individually associated with said bus lines, a common clock signal line ($\Phi$), and a plurality of first MOS precharging transistors ($T_1-T_8$) corresponding to the number of bus lines, said transistors having first electrodes connected to a voltage source (V), second electrodes individually connected to said bus lines, and gate electrodes connected to said common clock signal line, characterized by: means for enhancing the charging of discharged capacitances following a data bit transfer to shorten the average precharging time, said enhancing means comprising a plurality of lateral charge paths leading away from non-discharged capacitances and converging at discharged capacitances, and being defined by a plurality of second MOS precharging transistors ($T_{11}-T_{17}$) having first and second electrodes individually connected between successive second electrodes of said first MOS transistors, and gate electrodes connected to said common clock signal line.

6. A circuit as defined in claim 5, wherein the first and second electrodes of each second MOS transistor are respectively connected to the second electrodes of two first MOS·transistors connected to adjacent bus lines.

7. A circuit as defined in claim 6, wherein there are n bus lines and n−1 second MOS transistors.

8. A circuit as defined in claim 5, wherein each of the first electrodes of said first MOS transistors is connected to a common voltage source.

* * * * *